Patented July 8, 1924.

1,500,469

UNITED STATES PATENT OFFICE.

OTTO REIMANN, OF PFERDSDORF, GERMANY.

METHOD OF DYEING OR IMPREGNATING THE WOOD IN LIVING TREES.

No Drawing.   Application filed August 16, 1921.   Serial No. 492,797.

*To all whom it may concern:*

Be it known that I, OTTO REIMANN, a citizen of the Republic of Saxony, German Empire, residing at Pferdsdorf, Germany, have invented certain new and useful Improvements in Methods of Dyeing or Impregnating the Wood in Living Trees, for which I have filed an application in the German Empire June 30, 1920, Patent Number 340,490, Sept. 16, 1922, and of which the following is a specification.

The invention relates to a method of dyeing (impregnating) the wood in living trees.

It is already known to introduce preserving liquids into living trees by sawing or cutting slits or drilling holes into the trunk and surrounding this portion of the trunk with a box, into which the preserving liquid is introduced, which is then gradually sucked up into the tree. In order to impregnate the wood of the tree thoroughly and uniformly, it was hereby necessary to provide these slits or holes at various places and at various levels upon the living tree to ensure that the preserving liquid permeates the tree in all its parts and throughout its entire cross-sectional area. If instead of the impregnating liquid a dyestuff were used for dyeing the wood, the effect would be the same. A drawback of this method is that a large portion of the valuable wood is lost, because, as already stated, the slits, notches or holes in the trunk had to be provided in many places and at various levels along the trunk. This method has therefore never been taken up in the industries.

This invention relates to a method which enables the introduction of the dyestuff or the like into the growing tree in a very simple and reliable manner, so that the wood of the living tree is stained uniformly throughout the thickness of the trunk and up into the highest branches. The loss of wood is hereby so small that it can be neglected, as only in one place and only for a length of a few centimeters, the wood is destroyed, so that a great saving of the most valuable part of the wood is effected, as compared with the known method.

The improved method consists in drilling preferably parallel spaced holes approximately horizontally right through the tree, preferably just above the ground. In this manner a row of holes extending right across the tree is obtained, which is uniformly distributed over the cross-sectional area of the trunk. At an angle to this row of holes, another similar row of holes is then drilled at precisely the same level, so that the bores intersect one another. The cross-section of the tree trunk is thus divided in a grid-like manner. The bores are then closed at the back by suitable means and in a suitable manner and through one or more holes dyestuff from a receptacle is introduced under natural or artificial pressure. The dyestuff distributes itself in the intersecting channels uniformly over the whole cross-section of the trunk of the tree, rises in the trunk and the branches in the same manner as the sap and stains the wood right through in the colour of the dyestuff employed.

Besides the two rows of intersecting bores, a second set of holes may be provided a little higher up the trunk, whereby it is advantageous to put the two systems of channels into communication with one another by providing one or more oblique bores. In this manner variegated wood may be obtained by using several colours. Also impregnation with solutions of any kind may be performed in this way.

I claim as my invention:—

The method of impregnating the wood in living trees, which consists in providing in the trunk of the tree just above the ground in the same horizontal plane two intersecting rows of bores, dividing the cross-section of the trunk grid-like, so as to form a large number of uncut portions between the intersecting channels, said portions being distributed over the whole section of the tree, closing the outer ends of the bores, and introducing dyestuff into said bores.

In testimony whereof I have affixed my signature in presence of two witnesses.

OTTO REIMANN.

Witnesses:
   Frau AGNES KOCH, *geb.* FUSSERMANN,
   HILDEGARD MOSSE.